April 25, 1961    B. C. ELLIS, JR    2,980,958
SELF-CENTERING DEFLECTABLE CORE TUBE
Filed July 2, 1957    2 Sheets-Sheet 1
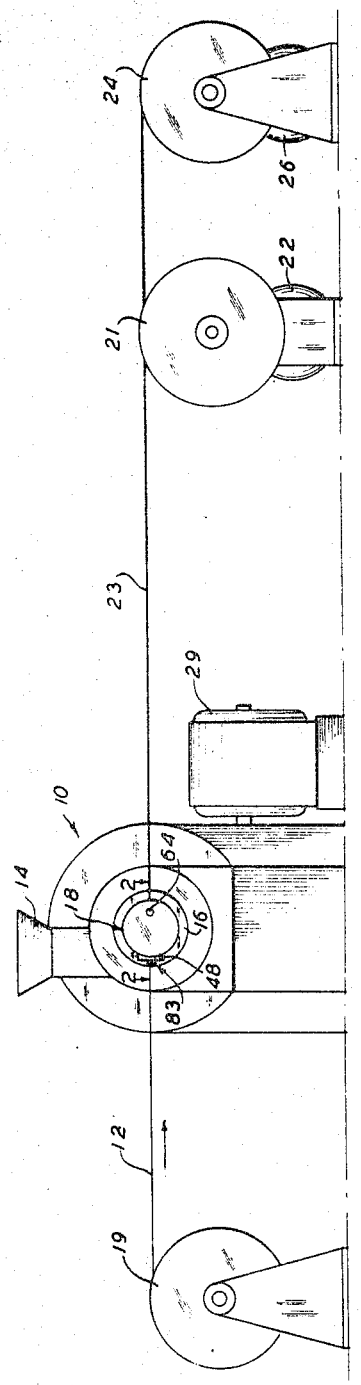
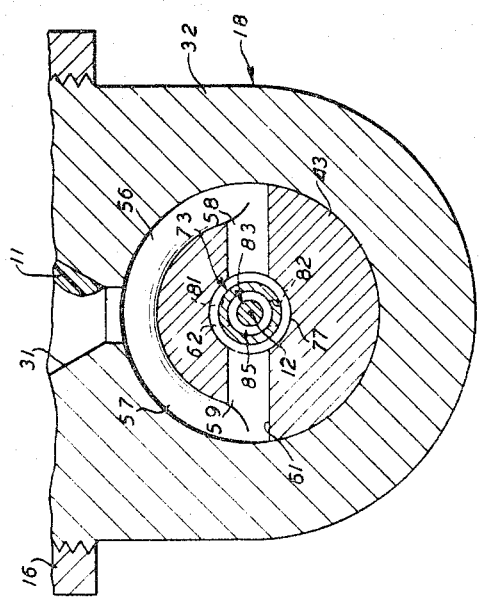
INVENTOR.
B. C. ELLIS, JR.
BY
ATTORNEY

United States Patent Office 2,980,958
Patented Apr. 25, 1961

2,980,958

SELF-CENTERING DEFLECTABLE CORE TUBE

Benjamin C. Ellis, Jr., Baltimore, Md., assignor to Western Electric Company, Incorporated, New York, N.Y., a corporation of New York Filed July 2, 1957, Ser. No. 669,586

1 Claim. (Cl. 18—13)

This invention relates to apparatus for extruding plastic material, and more particularly, although not exclusively, to apparatus for extruding plastic insulating and jacketing material on continuously advancing cores.

In producing an extruded covering on a core such as a filamentary conductor or the like, serious difficulties have been encountered in the past in maintaining the covering concentric with respect to the core. Eccentricity of extruded covering with respect to the core may result also from inaccurately aligned elements resulting from machining tolerance of the various elements. Another of the principal causes of eccentricity is the presence of unbalanced flow conditions within the extrusion head of the extruder used to form the covering on the core. This problem of unbalanced flow conditions is inherent in a conventional extruder of the cross-head type.

The extrusion head of a conventional extruder of the cross-head type is provided with an extrusion passage that communicates with and extends transversely with respect to the discharge end of an extrusion cylinder in which a stock screw is positioned for forcing a plastic material in an extrudable condition into the extrusion passage. Usually, a core tube is located at one end of the transversely extending extrusion passage and a conductor to be insulated is advanced through a guide passage in the core tube into a die positioned at the other end of the passage in the extrusion head. The core tube serves to guide the conductor so that the latter tends to pass through the axial center of the die orifice and also to prevent excessive drag on the conductors and thus tensile forces in the conductor from occurring as a result of the differences in the relative velocities of the conductor and the plastic material as the conductor and material is being passed through the extrusion head.

Due to the unavoidable 90° bend, the length of the path traversed by the plastic material flowing through that portion of the cross-head of the extrusion passage nearest to the stock screw is substantially shorter than that traversed by the material flowing through the portion diametrically opposite thereto. In addition, in some extruders of this type, the flow of the extrusion passage nearest to the stock screw approximates that of a fluid flow bounded by a single plate, whereas in the diametrically opposite portion of the cross section the flow approximates that of a fluid flow bounded by two parallel plates. Thus, friction losses in the portion of the extrusion passage nearest to the stock screw are appreciably lower than elsewhere in the same cross section.

As a result of the differences in the lengths of the paths traversed by the plastic material in various portions of the extrusion passage and the physical environment of their associated flows, there exist substantial differences in the pressure, consistency and the rate of flow of the plastic material throughout a cross section thereof entering the die orifice. This unbalance of pressure and resultant unbalance of plastic flow conditions throughout the cross section of the extrusion passage at the critical point of extrusion causes eccentricity of the coverings extruded on the conductor. The portion of the cross section nearest to the stock screw has the highest rate of flow and the more remote portion which is diametrically opposite thereto has the lowest rate of flow.

This resultant unbalanced flow condition of the plastic material frequently causes a lack of concentricity between the sheath and the core of the extruded product. The obvious result of a lack of concentricity is a variation in the wall thickness of the insulation on the conductor and thus electrical unbalance in cables constructed with the insulated conductors. Since rigid specifications established by the communications industry require the physical and electrical characteristics at all points along an insulated conductor to be uniform within narrow limits of tolerance, the concentricity of the insulated conductor must be closely controlled.

The existence of unbalanced flow conditions within an extruder creates even greater problems when the plastic insulation extruded onto the conductor is cellular in nature. In the manufacture of conductors insulated by a cellular form of a plastic such as cellular polyethylene, solid polymers of ethylene mixed with a heat decomposable blowing agent may be continuously extruded on a conductor moving through an extrusion die. The extrusion temperature should be so controlled that, as the tubular sheath of polyethylene issues from the die, the gas evolved by the heat decomposition of the blowing agent expands the sheath into a cellular form containing a multiplicity of minute blown cells uniformly distributed throughout the sheath. In order to prevent premature gas expansion within the confines of the extruder, it is important that the temperatures and pressures within the extruder should be accurately regulated and that the rate of extrusion and the linear speed of the conductor be adjusted suitably.

Various schemes have been developed for eliminating these unbalanced plastic flow conditions existing in the extruding head. However, while some of these schemes have been particularly successful, none of them have succeeded in completely eliminating the unbalanced flow condition. Thus, in practical application it has been found that there exists a certain amount of nonuniformity in the thickness of the insulation between the individual conductors and the outer periphery of the insulating covering. This nonuniformity becomes a serious problem when a multiconductor wire, constructed of the individually insulated conductors, is used in high frequency communication systems because of the resultant electrical unbalance therein.

It has been thought in the past that in order to obtain a tube of uniform wall thickness, or a sheath of uniform wall thickness or concentric with respect to a core, that the axis of the core or core tube must coincide with the axis of the extrusion die. However, as a practical matter, the pressure in the material in the extrusion head is not necessarily uniform and in order to obtain tubes or sheaths of uniform thickness it is necessary to offset the axis of the core tube with respect to the die, which requires delicate adjustments and consequently skilled operators.

In utilizing many of the extrusion apparatus presently available, the centering of a conductor with respect to the material extruded therearound is usually accomplished by adjusting the component part of the extrusion head manually at each setup for any given combination of conductive core and plastic material in order to obtain concentric sheaths on conductive cores. However, this requires skilled operators to be employed and a considerable amount of operating time to be lost in making the adjustments necessary to produce commercially acceptable products.

To overcome the above problems, the instant extruding apparatus has been developed which will permit the desired results and eliminate any adjustment of the axis of the core or the core tube with respect to the axis of the die.

It is an object of this invention to provide new and improved apparatus for extruding plastic material.

Another object of this invention is to provide new and improved apparatus for extruding plastic insulating and jacketing material upon continuously advancing cores.

A further object of the present invention is to provide apparatus for extruding insulation on a continuously moving strand so that the strand will be exactly centered within the insulation in which it is surrounded.

An extruding apparatus for extruding a sheath on an advancing core, embodying certain features of the invention, may include an extrusion head having a passage therethrough, a die secured within the passage, and a cantilever-type core tube mounted longitudinally of the passage. One end of the core tube is positioned deflectably adjacent to the die so as to deflect with respect thereto to correct for unbalanced flow conditions therebetween, whereby a concentric sheath is formed by equal volumetric flow of its plastic material circumferentially of the core as the core advances through the die.

Other objects and features of the invention will be more readily understood from the following detailed description when read in conjunction with the accompanying drawings, in which:

Fig. 1 is a side elevation of the apparatus forming one embodiment of the invention;

Fig. 3 is an enlarged, fragmental section taken along line 3—3 of Fig. 2.

Figure 2:
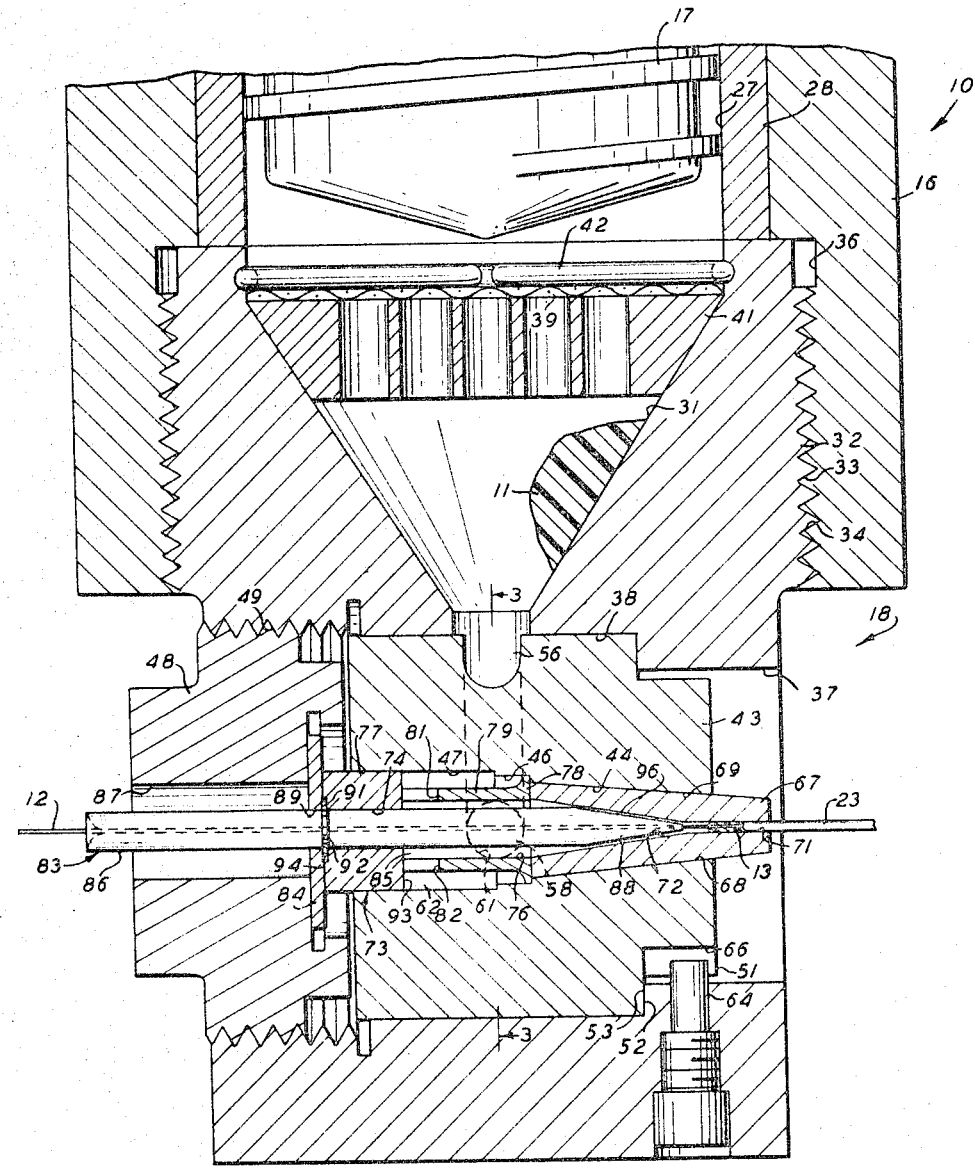
Fig. 2 is an enlarged, fragmental section taken along line 2—2 of Fig. 1.

Referring now to the drawings, wherein like numerals designate similar parts throughout the several views, and more particularly to Figs. 1 and 2, a cross-head or L-head type extruding apparatus, designated generally by the numeral 10, is provided to extrude plastic material 11 on a core or conductor 12 to form an insulated sheath or covering 13 therearound. The suitable plastic material 11 is placed in a hopper 14 and from there it flows to an extrusion cylinder 16. A stock screw 17 (Fig. 2) is positioned within the extrusion cylinder 16 and is rotated to knead and advance the plastic material 11 toward a delivery end of the extrusion bore where an extrusion head, designated generally by the numeral 18, is secured. The conductor 12 is pulled through the extrusion head 18 of the extrusion apparatus 10 from a supply stand 19 by a capstan 21 driven by suitable means, such as a motor 22. The insulated conductor 23 passes around the capstan 22 and is wound subsequently upon a takeup reel 24 driven by suitable means such as a motor 26.

Referring now to Fig. 2, there is shown the extrusion cylinder 16 having an elongated cylindrical extrusion bore 27 formed by a cylindrical lining 28, which is secured rigidly in the cylinder 16 and, in turn, in which the stock screw 17 is mounted rotatably. The stock screw 17 is designed to be rotated by a conventional drive means 29 (Fig. 1) for the purpose of working and forcing the plastic material along the extrusion bore 27 and into and through a tapered opening 31 in a body portion 32 forming part of the extrusion head 18. The extrusion head 18 is mounted detachably in the discharge end of the extrusion cylinder 16 by external threads 33 on the body portion 32 engaging corresponding internal threads 34 within a counterbore 36 in the extrusion cylinder 16 so that the tapered opening 31 therein forms a continuation of the extrusion bore 27. The tapered opening 31 communicates with a bore 37 and a counterbore 38 formed in the body portion 32 transversely with respect to the longitudinal axis of the extrusion bore 27.

A screen pack 39 and a backing plate 41 are mounted transversely across the discharge end of the bore 27 and supported within the head 18 and secured in place by a snap ring 42. The screen pack 39 strains out any lumps or foreign particles in the plastic material 11, and also performs a kneading action on the material 11.

A generally cylindrical capsule or tool holder 43, having a frusto-conical bore 44 and cylindrical counterbores 46 and 47 formed coaxially therein, is mounted within the bore 37 and the counterbore 38 in the body portion 32, and is held in place by means of an externally threaded retainer nut 48. The retainer nut 48 is engaged threadedly within complementary threads 49 of the counterbore 38 formed in the body portion 32. A reduced cylindrical portion 51 of the tool holder 43 forms a shoulder 52 thereon, and is placed within the bore 37 in the body portion 32 so that the shoulder 52 is in abutment with a corresponding radially inwardly projecting shoulder 53 formed by the bore 37 and the counterbore 38 in the body portion 32.

Referring now to Figs. 2 and 3, the tool holder 43 is provided with two, identical, interconnected, generally arcuate-shaped channels 56 and 57 formed on the peripheral surface thereof. The channels 56 and 57 extend arcuately in opposite directions from the exit end of the tapered opening 31 in the body portion 32 to diametrically opposed positions, the centers of which are contained in a vertical plane containing the axis of the tool holder 43. The channels 56 and 57 communicate with radially extending ports 58 and 59, respectively, formed by a common radial bore 61 through both sides of the tool holder 43. The ports 58 and 59, in turn, communicate with a pressure-equalizing chamber 62 formed by a tool member, designated generally by the numeral 73, and the counterbores 46 and 47 formed in the tool holder 43. The feed ports 58 and 59 are identical in size and preferably are circular in cross section. The feed ports 58 and 59 are positioned diametrically opposite to each other and symmetrical with respect to a vertical plane containing a longitudinal axis of the extrusion cylinder 16, whereby the ports 58 and 59 are equidistantly spaced from the exit end of the tapered opening 31 in the body portion 32. The tool holder 43 is held in this position and prevented from rotating in the bore 37 and counterbore 38 in the body portion 32 by the use of a screw means 64 projecting into a cooperating slot 66 in the tool holder 43.

A generally frustoconical-shaped extrusion die 67 is positioned coaxially within a complementary die receiving seat 68 formed in the tool holder 43 by a frustoconical bore 69 therein. The die has a cylindrical central bore 71 forming a cylindrical land through which the conductor 12 and plastic material 11 passes to form the insulated conductor 23. The die 67 has a frustoconical counterbore 72 to cooperate with the cylindrical bore 71 to form the die orifice or forming throat.

The substantially cylindrical tool 73 is positioned within the counterbores 46 and 47 and concentric therewith. The tool 73 has a bore 74 and counterbore 76 formed therein which are concentric with the counterbores 46 and 47. One end 77 of the tool 73 has substantially the same outside diameter as the diameter of the counterbore 47 whereas the opposing end 78 of the tool 73 projects outwardly to form an outside diameter substantially the same as the diameter of the counterbore 46. Intermediate of the opposing ends 77 and 78, the tool 73 has an annular peripheral recess 79 which cooperates with counterbores 46 and 47 and portions of the tool 73 adjacent the opposing ends 77 and 78 to form the chamber 62 into which the plastic material is fed through the two ports 58 and 59 formed in the tool holder 43.

Two diametrically opposed apertures 81 and 82 are formed in the wall of the tool 73, adjacent to the end of the chamber furthest from the die 67. The apertures 81 and 82 are utilized to permit the plastic material 11 to flow from the chamber 62 in two equal streams into a second pressure-equalizing chamber 85 formed in the counterbore 76. The apertures 81 and 82 are preferably circular in cross section, however, the radial positions thereof are of no importance as long as they are diametrically opposed, since the path or paths of the stream of plastic material 11 flowing from the ports 58 and 59 through the apertures 81 and 82 would be equal in both cases irregardless of the radial positions thereof.

A hollow cantilever core tube or core guide, designated generally by the numeral 83, is mounted coaxially within the bore 74, the counterbore 76, and the die 67 by means of a substantially cylindrical portion adjacent to the end 77 of the tool 73 and an annular member 84 in juxtaposition with the retaining nut 48. The core tube 83 is substantially cylindrical in shape and has a shank portion 86 extending through a central aperture 87 provided in the retainer nut 48 to guide the conductor 12 therethrough. The core tube 83 is positioned concentrically with respect to the counterbores 46 and 47, and is movable axially by means of the relative position of the retainer nut 48 with respect to the die 67. The free end of the core tube 83 has a relatively long frustoconical tip 88 which tapers from a maximum diameter on the lefthand side, as viewed in Fig. 2, to a minimum diameter adjacent to the cylindrical bore 71 in the extrusion die 67 and which is complemented by the relatively long frustoconical bore 72 in the extrusion die 67. The core tube 83 is of sufficient length and has a wall thickness at a section thereof small enough to permit the free end 88 to deflect with respect to the secured end thereof and the die 67.

The core tube 83 is positioned slidably in an aperture 89 in the annular member 84 and the bore 74 in the tool 73. The sliding movement of the core tube 83 is limited by the relative position of the annular member 84 and the tool 73 because of a C-shaped snap ring 91 being positioned in an annular groove 92 in the core tube 83. In this manner the fixed end of the cantilever portion of the free end of the core tube 83 is supported rigidly in the end 77 of the tool 73 thus permitting the core tube 83 to deflect with respect thereto and with respect to the die 67 under the influence of any unequal bending moments in the core tube 83 as a result of forces being applied thereto by the plastic material 11 in the space between the core tube 83 and the die 67. It is preferable that the core tube 83 be made of materials having a low Young's modulus of elasticity such as beryllium copper.

It is obvious that the core tube 83 could be so constructed so as to form a core or mandrel for a tubing operation. It is desirable that a core tube modified accordingly would project into and through the die orifice and may or may not be solid in form depending on whether or not it is desired that the tube be applied to a core or be hollow in form.

During operation of the extrusion apparatus the extrusion pressure of the plastic material 11 is exerted always on a shoulder 93 formed on the tool 73 which tends to urge the left hand end of the tool 73, as viewed in Fig. 2, against the annular member 84 with the snap ring 91 being held in a shallow counterbore or recess 94 in the tool 73. In this manner, the position of the core tube 83 with respect to the die 67 may be adjusted by changing the relative position of the retainer nut 48 with respect to the die 67. In practice however the retainer nut 48 is always turned until the movement thereof is arrested by the die 67 being in the extreme righthand position, as viewed in Fig. 2, or is completely seated in the bore 69 and the tool 73 is in its extreme righthand position, the position of which is limited by the end 78 thereof being adjacent to and in contact with the die 67. In this manner, the annular member 84 is urged against the tool 73 to cooperate therewith to position the core tube 83 in the proper position with respect to the die 67.

It is desirable to have the core tube 83 and die 67 so constructed and positioned that a substantially frustoconical passage 96 having an annular cross section will exist therebetween in which a unitary conical stream of plastic material 11 having approximately the same cross sectional area as that of the sheath or covering 13 enveloping the conductive core 12, so that as the material 11 is forced onto the core 12, with the cooperation of the core tube 83 and die 67, the velocity of the material 11 will be substantially that of the core 12 and relatively high pressure will be created rearwardly of the passage 96. The viscous character of the plastic material 11 converging in the die orifice will tend inherently to set up uniform flow conditions therein.

However, properly designed tools can be used to cause a relatively high pressure drop in the passage 96 between the core tube 83 and the counterbore 72, converging toward the bore 71 in the die 67. The relatively large pressure drop due to the shearing action in the plastic material 11 will occur on a relatively large area presented by the tip 88 of the core tube 83 and correspondingly high forces will be developed between the material 11, passing through the passage 96, and the core tube 83 and will act parallel to the surface thereof.

If an unbalanced flow condition of the plastic material 11 should begin to occur in the passage 96, higher shear forces would result immediately in one portion thereof than those present in another, thus developing greater forces parallel to the surface of the core tube 83 on one section of the core tube 83 than on the other thereby creating a greater moment in the core tube 83 in one direction than another. The resultant moment is oriented inherently to deflect the core tube 83 with respect to the counterbore 72 and bore 71 in the die 67 to correct any such initial unbalanced flow conditions. The magnitude of the moments will depend on the forces acting and on the effective length of the moment arm. The length of the moment arm may be determined by selecting the slope for the surface forming the tip 88 of the core tube 83 and selecting the distance separating the tip 88 from the support holding the secured end of the cantilever-type core tube 83.

If the flow of plastic material 11 is restricted more in one region of the passage 96 than in another, some of the material 11 will tend to shun the greater restriction and to flow around the core tube 83 circumferentially thereof, as opposed to axially, which will increase greatly the effective moment arm and thus the bending movement causing the core tube 83 to deflect with respect to the die 67 to correct any unbalanced flow conditions resulting from such a restriction.

As a result of the high pressure directed toward and through the conical passage 96, the material 11 is subject to pressures radial with respect to the core tube 83. Thus, when the plastic material 11 is pressed against the core tube, 83, there is a tendency to place the core tube 83 under relatively high tensile loading which will tend to keep the core tube 83 straight and pointing in the direction of flow and there is also a tendency for the core tube 83 to move to one side as a result of any unequal forces which may be present as a result of unbalanced flow conditions. The high pressure in the plastic material 11 will result in laminar flow thereof and the small spacing between the tip 88 of the core tube 83 and the bore 72 of the die 67 will create shearing of the material 11 and thus high radial forces, the differences in which for various sections will be magnified if any nonuniformity of flow exists therebetween.

Although effort has been made to design and construct an extruding head in which there is a minimum of plastic flow unbalance, as a practical matter, some unbalance may exist in the pressure heads of the flowing material 11 at different points throughout a cross sectional area of the annular passage 96. However, the novel extruding apparatus 10 has been developed for producing equality of the radial pressure in all directions with respect to the core tube 83 by mounting the core tube 83 resiliently in the die orifice. In this manner the pressure of the plastic material 11 circumferentially of the core tube 83 is equalized as the material 11 passes through the die orifice so as to equalize the volumetric flow of the plastic material 11 all around the circumference of the core 12 and thereby produce a sheath 13 thereon of uniform thickness and concentric with respect to the core 12.

*Operation*

During the operation of the extruding apparatus 10, the conductor 12 is advanced longitudinally at a predetermined speed in the direction of the arrow shown in Fig. 1. At the same time the suitable plastic material 11, such as polyethylene or the like, is advanced by the rotating stock screw 17 through the extrusion bore 27, screen pack 39, and backing plate 41 into the tapered opening 31 in the extrusion head 18.

Upon leaving the tapered opening 31, the plastic material 11 is split into two separate streams and flows through the symmetrical channels 56 and 57 formed in the outer periphery of the tool holder 43. The two separate streams of plastic material 11 initially flow circumferentially in opposite directions along the channels 56 and 57 in the tool holder 43 to the diametrically opposed feed ports 58 and 59, respectively. The two separate streams then flow through the feed ports 58 and 59, and enter the pressure-equalizing chamber 62 at the left-hand end thereof, as viewed in Fig. 2.

Since the channels 56 and 57 are identical and the feed ports 58 and 59 are spaced equidistantly from the exit end of the tapered opening 31, the paths traversed by the two separate streams of plastic material 11 are identical in all respects. Accordingly, unbalanced flow of plastic material 11 entering the pressure-equalizing chamber 62 through the feed ports 58 and 59 are effectively damped out.

The feed ports 58 and 59 are located near the extreme righthand end of the pressure-equalizing chamber 62 and therefore the plastic material must flow in equal length paths to the apertures 81 and 82 at the opposing end of the chamber 62 to a portion of the pressure-equalizing chamber 85 which is relatively remote from the die orifice.

The flow within the pressure-equalizing chambers 62 and 85 is relatively slow compared to the flow of the plastic material 11 through the annular passage 96 and the die orifice at its minimum diameter. This relationship tends to maintain a substantially constant static pressure at the entrance of the passage 96 and the plastic material 11 flowing into the passage 96 is substantially uniform in consistency and rate of flow. However, should any unbalance exist in the flow of plastic material 11 in the passage 96, it will be balanced out by the deflection of the free end 88 of the core tube 83 with respect to the die 67, as a result of the uneven radial pressures on the core tube 83. The tip 88 of the core tube 83 will seek a position with respect to the bore 72 in the die 67 to equalize the force applied by the extrusion pressure and forces of the plastic material 11 at all points around the core tube 83 to produce a concentric plastic insulating sheath 13 on the conductor 12.

The elongated tip 88 of the core tube 83 also shields the advancing conductor 12 until immediately before it enters the cylindrical bore 71 in the die 67. This shielding is very important when the conductor 12 is fragile and cannot withstand a substantial amount of drag imposed by the plastic material 11 thereon. Since the drag on the conductor 12 is proportional to the length of the exposed conductor 12 and the relative velocity between the conductor 12 and the plastic material 11, the shielding afforded by the core tube 83 reduces the stresses in the conductor 12 or any other desired type of core.

The term "plastic insulating material," as employed in this specification and the following claim, will be understood to include both thermoplastic insulating materials, such as polyethylene, or the like and thermosetting insulating compounds, such as Neoprene compounds or other rubbery elastomers, or the like.

It is obvious that the process described above may be employed for applying coatings of forming tubes of materials other than plastic materials, that the core need not be conductive, and that the apparatus therefore may be of any suitable construction, without departing from the spirit and scope of the invention.

It is to be understood that the above described arrangements are simply illustrative of the application of the principles of the invention. Numerous other arrangements may be devised readily by those skilled in the art which will embody the principles of the invention and fall within the spirit and scope thereof.

What is claimed is:

An apparatus for extruding plastic material on an advancing core, which comprises an extrusion bore through which a plastic material is advanced under pressure, an extrusion head secured to the delivery end of said bore, an extrusion die having an extrusion orifice mounted adjacent to one end of the extrusion head, and a resilient, beryllium copper core tube having a solid annular cross section positioned longitudinally in the extrusion head, one end of which is positioned deflectably adjacent to the extrusion die and within the orifice thereof so as to equalize the forces of the plastic material circumferentially around said core tube and thus the core as the core and the plastic material passes through the die orifice, whereby equal volumetric flow of the plastic material circumferentially of the advancing core is obtained.

References Cited in the file of this patent

UNITED STATES PATENTS

| | | |
|---|---|---|
| 2,257,104 | Burrows et al. | Sept. 30, 1941 |
| 2,340,808 | Gruetjen | Feb. 1, 1944 |
| 2,366,528 | Heath | Jan. 2, 1945 |
| 2,893,056 | Henning | July 7, 1959 |

FOREIGN PATENTS

| | | |
|---|---|---|
| 857,774 | France | Apr. 29, 1940 |
| 638,095 | Great Britain | May 31, 1950 |